Jan. 28, 1969     C. D. MECKLIN     3,423,913
COTTON PICKER SPINDLE MOISTENER ASSEMBLY
Filed Jan. 27, 1966
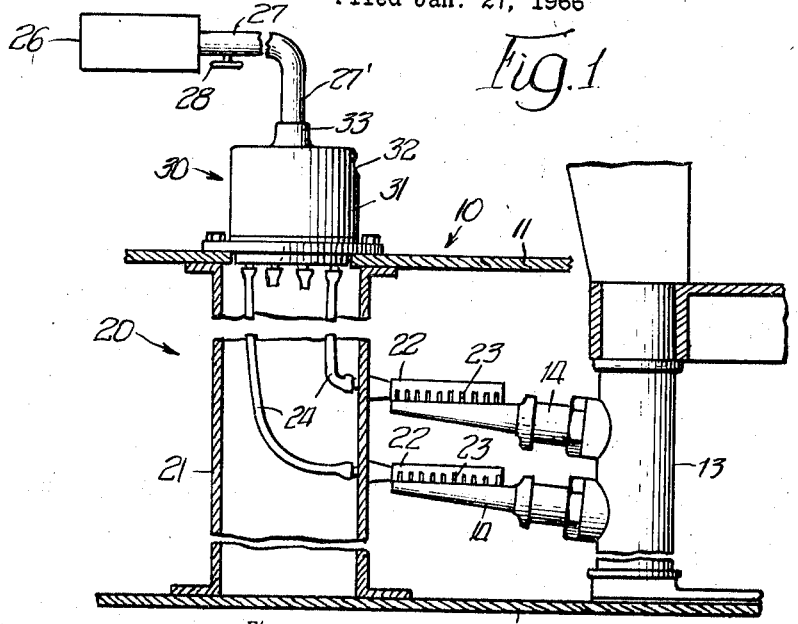
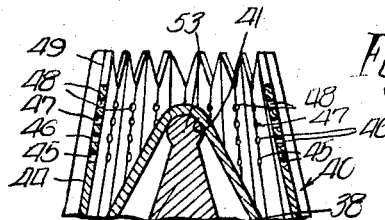
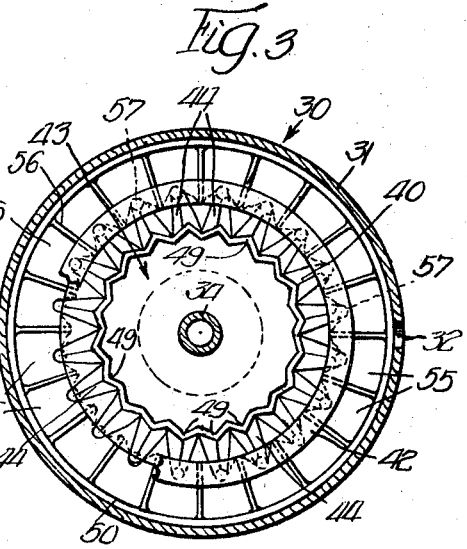
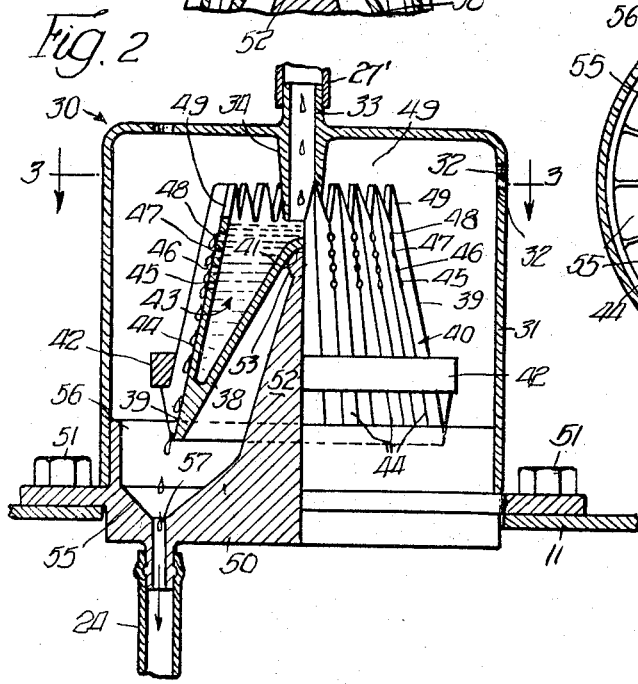
Inventor:
Charles D. Mecklin,
By John J. Kowalik
Atty

United States Patent Office 3,423,913
Patented Jan. 28, 1969

3,423,913
COTTON PICKER SPINDLE MOISTENER ASSEMBLY
Charles D. Mecklin, Memphis, Tenn., assignor to International Harvester Company, a corporation of Delaware
Filed Jan. 27, 1966, Ser. No. 523,425
U.S. Cl. 56—41
Int. Cl. A01d 45/18
18 Claims

ABSTRACT OF THE DISCLOSURE

A fluid distributor for the spindles of a cotton harvester comprising a distributor head, a balance supporting the head to maintain it in vertical position regardless of the disposition of the harvester, the distributor head mounted in a well filled with fluid to a predetermined level and the head having outlet ports at a common level, each port connected to a separate channel element which feeds its separate moistener pad.

---

This invention relates generally to a fluid distributing device, and more specifically relates to a moistener assembly for uniformly distributing moistening fluid to the picking spindles of a cotton harvesting machine.

The typical cotton harvester of current construction includes a picking drum provided with a plurality of continuously rotating picking spindles which collect the cotton by engaging with the bolls on the cotton plants during the harvesting operation. To facilitate the cotton harvesting operation, such cotton harvesters also usually include a rigidly mounted moistener device which supplies a constant flow of moistening fluid such as water to each of these picking spindles. For instance, U.S. Patent 2,884,754 describes and claims a moistener assembly for distributing fluid to the cotton picking spindles which has proven to be highly successful in operation.

In accordance with this invention, it has been found that the operation of spindle moistening assemblies such as disclosed in Patent 2,884,754 can be greatly improved by providing the moistener with means to assure that the fluid will be uniformly distributed to the picking spindles regardless of the changes in the attitude or level of the moistener assembly or of the harvester which normally occur as the harvester traverses the cotton field.

Accordingly, it is an object of this invention to provide an improved moistener assembly for distributing a uniform metered flow of moistening fluid to each of the picking spindles of a cotton harvester.

It is a further object of this invention to provide a moistener assembly for a cotton harvester which continuously distributes a uniform metered flow of moistening fluid to the individual picking spindles of the harvester by automatically compensating for changes in attitude or level of the moistener assembly or of the harvester normally occurring during the harvesting operation.

It is a still further object of this invention to provide a cotton harvester spindle moistener assembly with a fluid distributor head which uniformly distributes the moistening fluid to the cotton picking spindles regardless of variations in the attitude or level of the moistener assembly or of the harvesting machine.

It is still another object of this invention to provide a moistener assembly for distributing moistening fluid to the picking spindles of a cotton harvester which includes a minimum number of moving parts, and which is simple and economical to manufacture and maintain.

Other objects and features of this invention will become apparent from a description of an embodiment thereof, as illustrated in the accompanying drawing. In this drawing:

FIGURE 1 is a fragmentary elevational view in partial section of the moistener assembly in accordance with this invention shown in place on the drum housing of a cotton harvester;

FIGURE 2 is an enlarged fragmentary cross-sectional view of the gimbaled fluid distributor head for the spindle moistener assembly in accordance with this invention;

FIGURE 3 is a cross-sectional view taken along the line 3—3 in FIGURE 2; and

FIGURE 4 is a fragmentary cross-sectional view of the upper portion of the gimbaled fluid distributor head as shown in FIGURE 2.

Generally described, this invention contemplates the provision of a spindle moistener assembly for a cotton harvester which assures that a uniform flow of moistening fluid, such as water, will be distributed to each of the picking spindles throughout the entire cotton harvesting operation. In this regard, the spindle moistener assembly in accordance with this invention is provided with a hollow distributor head defining a reservoir to receive and accumulate a volume of fluid for distribution to the spindles. This distributor head includes fluid channels which direct an even flow of the moistener fluid accumulating in the reservoir to each of the spindles on the harvester. Additionally, the head is moveably mounted within the moistener assembly by gimbaled connection means which permits the head to pivot within the moistener assembly in response to movements of the cotton harvester. By this novel arrangement, the gimbaled distributor head will distribute the moistening fluid accumulated therein to the picking spindles regardless of variations or changes in the attitude or level of the moistener assembly or of the harvester which normally occurs as the harvester traverses the cotton field.

More specifically, as shown in FIGURE 1, the cotton harvester in which this novel moistener assembly is employed includes a drum housing 10 formed by an upper housing plate 11 and the lower plate 12. As is well known to those skilled in the art, the drum housing 10 is positioned on the lower portion of the harvesting machine, and houses a picking drum comprising a plurality of vertically-mounted spindle carrying bars 13. Each of the bars 13, only one of which is illustrated in FIGURE 1, carries a series of vertically-spaced picking spindles 14. In addition, the bars 13 house suitable gear trains, not shown, which function to rotate the spindles 14 about their individual spindle axes during the harvesting operation.

The moistener assembly in accordance with this invention, generally indicated by the numeral 20, includes a hollow stand 21 which is mounted on the drum housing 10 adjacent the spindles 14 and which supports a plurality of moistener elements 22 in a vertically-spaced arrangement so that each rotating picking spindle 14 is engaged by a moistener element. These elements 22 are preferably of the type disclosed in detail in the aforementioned patent, and include resilient fingers 23 of a suitable elastomeric material which are in constant wiping contact with the associated picking spindle 14. As disclosed in said patent, each of the moistener elements 22 thereby defines a nozzle for conducting moistening fluid such as water onto each of the rotating picking spindles 14 during the harvesting operation.

As further shown in FIGURE 1, the moistener assembly 20 also includes a fluid distributor 30 which is connected to each of the moistener elements 22 by suitable individual conduit means, such as illustrated by conduits 24. These fluid conduits 24 operate to direct a uniform metered flow of moistening fluid from the distributor 30 to each of the spindles 14 during the harvesting operation, as explained further hereinafter, and in this embodiment are protectively housed within the stand 21. To supply a constant flow of moistening fluid to this distributor 30, for uniform distribution to the individual moistening elements 22, the moistener assembly 20 is also provided with a suitable fluid reservoir 26, shown schematically in FIGURE 1. This reservoir 26 is positioned in any convenient location on the cotton harvester, preferably near the drum housing 10, and is in fluid communication with the distributor 30 through the reservoir conduit 27. Furthermore, an adjustable metering valve 28 is included in this conduit 27 in this embodiment so that the volume of fluid flowing from the reservoir 26 to the distributor 30 can be selectively controlled by the operator of the cotton harvester.

The distributor 30 of this moistening assembly, as shown in FIGURE 2, includes a cylindrical housing 31 which shields the assembled distributor from damage by accumulated dirt, plant matter or the like during the harvesting operation. In addition, the interior of housing 31 in this embodiment is vented to the atmosphere through the air port 32, shown in FIGURES 2 and 3, so that there is no substantial build-up of air pressure within the housing which would inhibit the distribution of moistening fluid to the picking spindles 14. Housing 31 is further provided with an inlet connection 33 having a lower nozzle portion 34 which brings the discharge end 27' of the reservoir conduit 27 into fluid communication with the interior of the housing. By this arrangement, the metered volume of moistening fluid flowing through conduit 27 from the reservoir 26 will be accurately directed into the fluid distributor 30, from which the fluid will be distributed to the individual moistening elements 22 and to the rotating picking spindles 14.

According to this invention, the distributor head 30 is provided with a hollow distributor head 40 which is preferably frusto-conical in configuration and which defines an intermediate reservoir 43 to receive and accumulate the metered flow of moistening fluid discharging from the conduit 27 during the harvesting operation. In addition, the side portions 39 of conical head 40 include a plurality of V-shaped grooves 44, preferably equal in number of spindles 14 to which the moistening fluid is to be distributed. In the illustrated embodiment, for example, the head 40 is provided with twenty grooves 44 about its periphery, and will thus function to distribute moistening fluid to twenty of the rotating picking spindles 14. Further, each groove 44 of this distributor head 40 includes a series of vertically-spaced metering orifices 45, 46, 47, and 48, and a V-shaped top notch 49, as shown in FIGURES 2 and 3. These spaced orifices and notches are substantially equal in dimension and define discharge ports equally spaced about the distributor head 40 which bring the intermediate reservoir 43 into fluid communication with each of the grooves 44.

Further in accordance with this invention, the hollow fluid distributor head 40 is mounted on the drum housing 10 in a manner permitting the head to distribute a uniform metered flow of fluid from reserovir 43 to each of the elements 21 despite changes in the attitude or level of the moistener assembly 20 or of the cotton harvester which occur during the normal harvesting operation. In this connection, the distributor head 40 is supported on the drum housing 10, within protective housing 31, by means of a gimbaled connection with a distributor base plate 50.

To accomplish this gimbaled support of the distributor head 40, the base plate 50 in this embodiment is fixed to the plate 11 of the drum housing 10 by suitable means, such as bolts 51, and is provided with an upwardly extending central portion 52 which terminates in a support ball 53. In addition, the bottom portion 38 of the hollow head 40 is recessed as shown in FIGURES 2 and 4 to define a centrally disposed socket 41 which frictionally receives the support ball 53. The gimbaled connection formed by the seating of the support ball 53 within the socket 41 as clearly illustrated in FIGURE 4, will thus permit the head 40 to pivot about the support ball in response to gravitational and inertial forces. Therefore the head 40 and the moistening fluid accumulating within the reservoir 43 will be maintained in a substantially level and stable position during the harvesting operation.

If the distributor head 40 is formed from a lightweight material such as plastic or the like it is preferred that a balance ring 42, of a heavy material such as lead, be positioned around the lower portion of head 40 below the gimbaled connection between the head 40 and the support ball 53. The weight of this balance ring 42 assists in maintaining the support ball 53 in frictional engagement within the socket 41, and additionally increases the inertia of the head 40 that tends to maintain the head in a level position on the cotton harvester.

Since the distributor head 40 in accordance with this invention is gimbaled, as described above, it is apparent that the surface of the moistening fluid accumulating in the intermediate reservoir 43 will be maintained in a substantially stable and level condition during the harvesting operation. The portion of the volume of moistening fluid discharging into each of the grooves 44 through the associated orifices 45, 46, 47 and 48, or additionally through the top notch 49, will therefore be substantially equal. In addition, it is apparent that the uniform positioning and the relative vertical spacing of the orifices 45 through 48 and the notch 49 in each of the grooves 44 permits the volume of fluid flowing into each groove to be regulated by varying the volume of moistening fluid accumulated in the reservoir 43. In this connection, adjustment of the metering valve 28 to a maximum open position will raise the surface of fluid in reservoir 43 so that a predetermined maximum volume of moistening fluid discharges into the grooves 44 by flowing through each of the orifices 45, 46, 47, and 48, and over the notch 49. Likewise, adjustment of the valve 28 to a minimum open position will result in a minimum volume of fluid within reservoir 43 so that the fluid flows into each of the grooves 44 through the lowermost orifice 45 only. The valve 28 of course could also be adjusted to provide a volume of flow of moistening fluid between these maximum and minimum conditions. By this construction, the uniform distribution of fluid from the storage reservoir 26 to the grooves 44 in the distributor head 40 can be selectively controlled by the operator of the cotton harvesting machine.

The moistener assembly 20 in accordance with this invention also includes means to conduct the metered flow of moistening fluid flowing from the grooves 44 of distributor head 40 to each of the moistener elements 22 and to the associated picking spindles 14. To accomplish this, the circumference of base plate 50 in this moistener assembly is provided with a plurality of wells 55, as seen in FIGURES 2 and 3. Each well 55 is separated by dividers 56, and is positioned below one of the grooves 44 of the distributor head 40 to receive the moistening fluid discharging from the intermediate reservoir 43 along the associated groove 44. Each well 55 further includes an outlet 57 which is connected by a conduit 24 to an individual spindle moistener element 22. As illustrated in FIGURE 2, the outlet 57 in each well 55 is positioned directly below the associated groove 44 in the distributor head 40. By this arrangement, the accumulation of a substantial volume of moistening fluid in the wells 55 is prevented, and the moistening fluid received by each well 55 will flow rapidly through the outlet 57 to the spindle moistener element 21.

The resulting uniform distribution of moistening fluid by means of the moistener assembly in accordance with the invention will be more fully understood from a description of the operation of the assembly. To begin this operation, the metering valve 28 is first opened to permit the moistening fluid such as water to flow from the storage reservoir 26 through conduit 27 into intermediate reservoir 43 defined by the distributor head 40. Since this head 40 is gimbaled in place on the drum housing 10 of the cotton harvester, as described hereinabove, gravitational and inertial forces will maintain the head 40, and the fluid accumulated in the reservoir 43, in a substantially level, stable position during the harvesting operation. The volume of fluid within reservoir 43 can therefore be accurately controlled by adjustment of the metering valve 28, and the amount of fluid discharging from reservoir 43 to each of the grooves 44 will be substantially equal. As the volume of fluid accumulated within reservoir 43 increases, an equal portion of the fluid will begin flowing out of the reservoir 43 into the downwardly and outwardly tapering grooves 44 through each of the metering orifices 45, 46, 47 and 48, or additionally over the notches 49, depending upon the selected volume of moistening fluid accumulating in reservoir 43. The grooves 44 of distributor head 40 direct the moistening fluid downwardly to the associated well 55, from which the fluid immediately flows through the outlet 57 into the conduit 24. Conduit 24 then conducts the fluid to the moistening element 22 for discharge onto the associated rotating picking spindle 14.

It is apparent from the above description that the gimbaled distributor head 40 in accordance with this invention assures that the volume of fluid flowing to each moistener element 22 and flowing onto its associated picking spindle 14 will be substantially constant and uniform. The gimbaled distributor head 40 in accordance with this invention therefore compensates for any change in horizontal positioning of the moistener assembly 20 or the cotton harvester, and distribution of moistening fluid to the picking spindles 14 by this assembly is unaffected by the changes in the level of the cotton harvester which normally attend the movement of the harvester through the field during the cotton picking operation.

It will be appreciated that the foregoing description is merely illustrative of the embodiment of this invention. Various modifications of this moistener assembly may be devised by those skilled in the art without departing from the scope of this invention, as set forth in the accompanying claims.

What is claimed is:

1. In a moistener assembly for distributing a uniform flow of moistening fluid to the picking spindles of a cotton harvester, a hollow distributor head having side portions and a bottom portion defining a reservoir to receive and accumulate a volume of moistening fluid for distribution to said spindles, said head including a plurality of uniformly spaced discharge ports in fluid communication with said reservoir through each of which a substantially equal portion of said fluid volume accumulating within said reservoir will discharge, fluid conduit means associated in fluid communication with each of said discharge ports to direct the portion of fluid discharged from each of said ports toward a picking spindle on said harvester, and gimbal means operably connected to said distributing head to freely support said head on said harvester and maintain said head and said fluid volume accumulating therein in a substantially level and stable position so that the discharge of said fluid from said gimbaled head through said ports is substantially uniform, whereby the distribution of moistening fluid to said picking spindles by said head is substantially unaffected by changes in attitude or level of the cotton harvester during the harvesting operation.

2. The invention according to claim 1 wherein each of said discharge ports is positioned within a longitudinal groove provided in the outer side portions of said head so that said grooves define a chanel to direct the moistening fluid discharged from said ports toward said associated fluid conduit means.

3. The invention according to claim 2 wherein each of said groove includes a plurality of vertically spaced discharge ports in fluid communication with said reservoir and wherein said ports are uniformly spaced in said head to permit adjustment of the volume of moistening fluid discharged into each of said grooves through said ports by selective control of the fluid volume accumulated in said reservoir.

4. The invention according to claim 3 wherein the top portion of each of said grooves includes a notch in fluid communication with said reservoir above said vertically spaced ports and wherein said notches are uniformly spaced in said head so that said notch and said ports permit a predetermined maximum volume of moistening fluid to discharge into each of said grooves from said reservoir.

5. The invention according to claim 1 wherein said distributor head comprises a hollow frusto-conical body having downwardly and outwardly tapering side portions.

6. The invention according to claim 1 wherein said gimbal means comprises a recessed socket centrally disposed in said bottom portion of said head and further comprises a support base positioned below said head including an upwardly extending support ball frictionally received within said socket.

7. The invention according to claim 6 wherein the lower portion of said head below said socket is circumscribed by a heavy balance ring urging said ball into frictional engagement with said socket.

8. The invention according to claim 6 wherein said support base includes a plurality of fluid wells and wherein each of said wells is positioned below said head in fluid communication with one of said discharge ports and in fluid communication with said conduit means to direct the portion of moistening fluid discharged from said ports to said conduit means.

9. In a moistener assembly for distributing a uniform flow of moistening fluid to the picking spindles of a cotton harvester, a hollow distributor head having downwardly and outwardly tapering side portions and a bottom portion defining a reservoir to receive and accumulate a volume of moistening fluid for distribution to said spindles, said head including a plurality of longitudinal grooves on the outer side portions thereof and further including a plurality of uniformly spaced discharge ports in fluid communication with said reservoir within said grooves to discharge a substantially equal portion of the moistening fluid volume accumulating in said reservoir into each of said grooves, fluid conduit means associated in fluid communication with each of said grooves to direct the portion of moistening fluid discharged from said grooves toward a picking spindle on said harvester, and gimbal means operably connected to said distributor head to freely support said head on said harvester and maintain said head and said moistening fluid volume accumulating therein in a substantially level and stable position, said gimbal means comprising a recessed socket centrally disposed in said bottom portion of said head and a support base positioned below said head including an upwardly extending support ball frictionally received within said socket, whereby the discharge of said fluid from said gimbaled distributor head through said ports is substantially uniform and the distribution of moistening fluid to said picking spindles by said head is substantially unaffected by changes in attitude or level of the cotton harvester during the harvesting operation.

10. The invention according to claim 9 wherein said support base includes a fluid well positioned below said head in fluid communication with each of said grooves and in fluid communication with said fluid conduit means to receive the portion of moistening fluid discharged from said groove and to direct said fluid into said conduit means.

11. The invention according to claim 10 wherein said ports are uniformly spaced in said head to permit adjustment of the volume of moistening fluid discharged into each of said grooves through said ports by selective control of the fluid volume accumulated in said reservoir.

12. The invention according to claim 11 wherein the top portion of each of said grooves includes a notch in fluid communication with said reservoir above said vertically spaced ports and wherein said notches are uniformly spaced in said head so that said notch and said ports permit a predetermined maximum volume of moistening fluid to discharge into each of said grooves from said reservoir.

13. The invention according to claim 12 wherein the lower portion of said head below said socket is circumscribed by a heavy balance ring urging said ball into frictional engagement with said socket.

14. In a cotton harvester having picking spindles, a hollow frusto-conical distributor head for use in a moistening assembly, said head comprising outwardly and downwardly tapering side portions and a bottom portion defining a reservoir to receive and accumulate a volume of moistening fluid, said head including a plurality of longitudinal grooves on the outer side portions thereof and further including a plurality of discharge ports uniformly spaced within said grooves in communication with said reservoir through which a substantially equal portion of moistening fluid may discharge from said reservoir for distribution to said picking spindles, and a recessed ball-receiving socket centrally disposed in said bottom portion of said head, a ball on the harvester operably received in said socket for maintaining said head in a predetermined position on said harvester.

15. The invention according to claim 14 wherein said discharge ports are vertically spaced in each groove and in fluid communication with said reservoir.

16. The invention according to claim 15 wherein the top portion of each of said grooves includes a notch in fluid communication with said reservoir above said vertically spaced discharge ports.

17. The invention according to claim 14 wherein the lower portion of said head below said socket is circumscribed by a heavy balance ring.

18. In a moistening system for the spindles of a cotton harvester of the type having a fluid reservoir, plural means chaneling fluid to individual spindles and a gravity feed distributor between said means and reservoir for distributing fluid from the reservoir in equal increments to each of the plural means, the improvement comprising: said distributor having discharge ports at a common level connected to respective chaneling means, means for mounting the distributor in self-leveling relation for maintaining a fluid level in the distributor the same for all ports to effect equal increments distribution of fluid through said channeling means irrespective of the inclination of said harvester.

References Cited

UNITED STATES PATENTS

| | | | |
|---|---|---|---|
| 2,373,099 | 4/1945 | Burk | 137—561 |
| 2,654,204 | 10/1953 | Grosvenor | 56—41 |
| 2,884,754 | 5/1959 | Bornzin et al. | 56—41 |
| 3,202,167 | 8/1965 | De Young et al. | 137—262 X |

LUCIE H. LAUDENSLAGER, *Primary Examiner.*

U.S. Cl. X.R.

137—262, 561